US011919035B2

(12) United States Patent
Tsotsis

(10) Patent No.: US 11,919,035 B2
(45) Date of Patent: Mar. 5, 2024

(54) METHODS AND APPARATUS FOR LAYER-BY-LAYER DEPOSITION

(71) Applicant: The Boeing Company, Chicago, IL (US)

(72) Inventor: Thomas K. Tsotsis, Santa Ana, CA (US)

(73) Assignee: The Boeing Company, Arlington, VA (US)

( * ) Notice: Subject to any disclaimer, the term of this patent is extended or adjusted under 35 U.S.C. 154(b) by 115 days.

(21) Appl. No.: 17/362,429

(22) Filed: Jun. 29, 2021

(65) Prior Publication Data

US 2022/0048065 A1 Feb. 17, 2022

Related U.S. Application Data

(60) Provisional application No. 63/064,766, filed on Aug. 12, 2020.

(51) Int. Cl.

| | |
|---|---|
| ***B05D 1/12*** | (2006.01) |
| ***B05D 7/00*** | (2006.01) |
| ***B64C 1/40*** | (2006.01) |
| ***B64F 5/10*** | (2017.01) |

(52) U.S. Cl.

CPC ............... *B05D 1/12* (2013.01); *B05D 7/584* (2013.01); *B64F 5/10* (2017.01); *B05D 2401/20* (2013.01); *B64C 1/40* (2013.01)

(58) Field of Classification Search

None

See application file for complete search history.

(56) References Cited

U.S. PATENT DOCUMENTS

2017/0056834 A1* 3/2017 Bhushan .................. C08K 3/36

OTHER PUBLICATIONS

Vaziri et al., "Ultrahigh Thermal Isolation Across Heterogeneously Layered Two-dimensional Materials," Science Advances, Aug. 16, 2019, (8 pages).

* cited by examiner

*Primary Examiner* — Michael P. Rodriguez

(74) *Attorney, Agent, or Firm* — Hanley, Flight & Zimmerman, LLC

(57) ABSTRACT

Methods, apparatus, systems and articles of manufacture are disclosed to prepare an aircraft surface, including depositing a first solution on a substrate on the aircraft surface, the substrate having a first charge, the first solution having a second charge opposite the first charge, the first solution including a carrier fluid, removing a first amount of the first solution deposited on the substrate to form a first layer on the substrate, depositing a second solution on the first layer, the second solution having the first charge, the second solution including the carrier fluid, and removing a second amount of the second solution deposited on the first layer to form a second layer on the first layer to prepare the aircraft surface.

20 Claims, 8 Drawing Sheets

400
418
416
414
412
410
408
406
404
402

METHODS AND APPARATUS FOR LAYER-BY-LAYER DEPOSITION

RELATED APPLICATION

This patent arises from an application claiming the benefit of U.S. Provisional Patent Application No. 63/064,766, which was filed on Aug. 12, 2020. U.S. Provisional Patent Application No. 63/064,766 is hereby incorporated herein by reference in its entirety. Priority to U.S. Provisional Patent Application No. 63/064,766 is hereby claimed.

FIELD OF THE DISCLOSURE

This disclosure relates generally to insulation coatings and, more particularly, to methods and apparatus for layer-by-layer deposition.

BACKGROUND

Temperatures at cruising altitudes of aircraft can be as low as −70° Fahrenheit. The temperature of components of aircraft including the fuselage are regulated, for example, to provide a habitable temperature for the passengers and crew of the aircraft. To prevent the flow of heat from the interior of the fuselage to the surrounding atmosphere and to reduce the required load on heating elements for the fuselage, one or more thermal-insulation coatings can be included in and about the fuselage and/or in and about other aircraft components.

Furthermore, high-speed aircraft (e.g., operating in excess of Mach 3) can develop skin temperatures in excess of 500° F., meaning that cargo and/or passengers contained therein need to be held to much lower temperatures to avoid damaging cargo and/or harming individuals. To prevent flow of heat from the exterior into the interior of the fuselage and to reduce the required load on cooling elements for the fuselage, one or more thermal-insulation coatings can be included in and about the fuselage and/or in and about other aircraft components.

DETAILED DESCRIPTION

Figure 1:
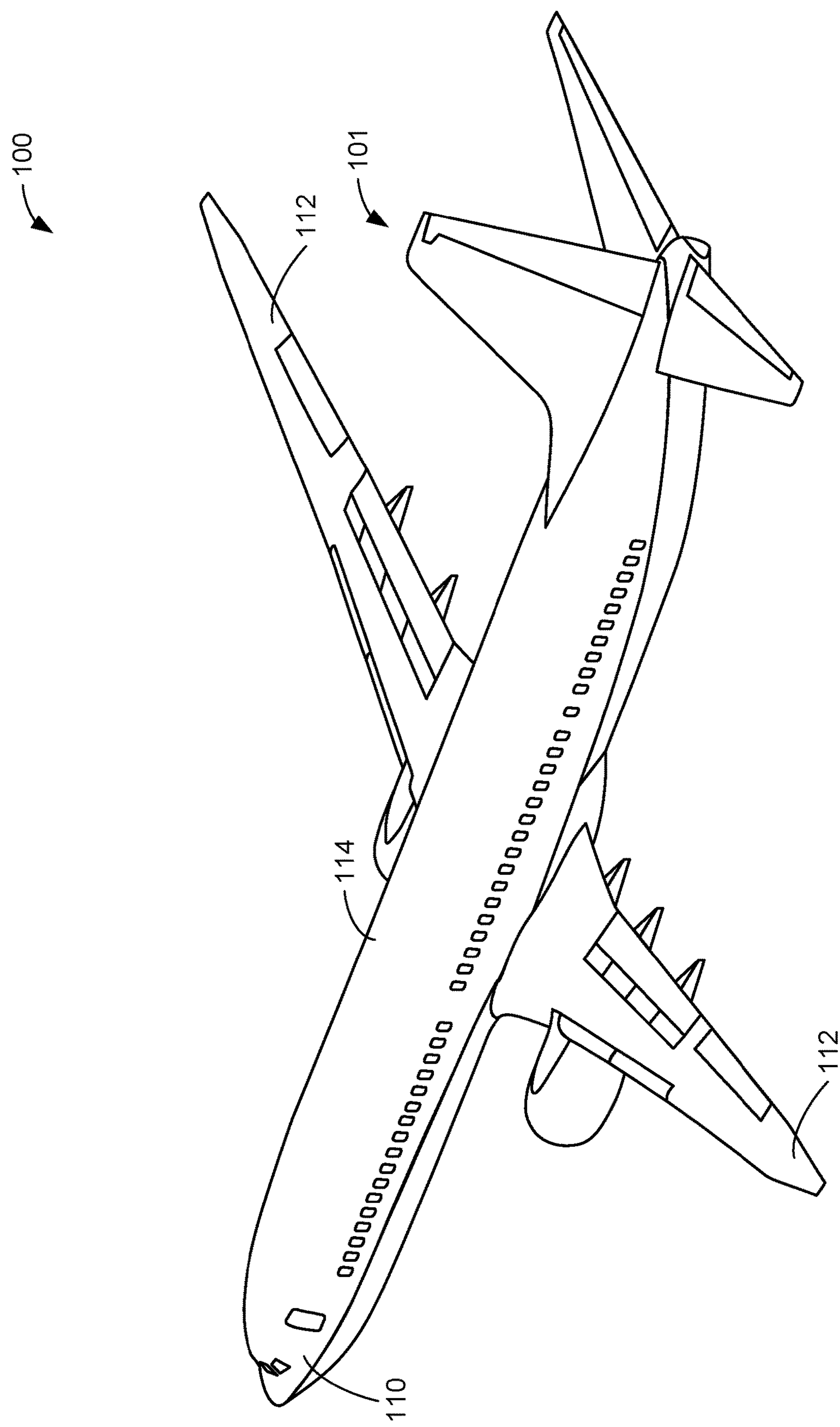
FIG. 1 illustrates an example aircraft that can be used to implement the example methods and apparatus disclosed herein.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Subsonic-aircraft components such as the fuselage are kept pressurized and at an increased temperature relative to the atmosphere while an aircraft is at cruising altitude. For example, the interior of the fuselage of the aircraft can be kept at a temperature between 60° to 80° Fahrenheit while the temperature at the exterior of the aircraft is as low as −40° to −70° Fahrenheit. The fuselage can include insulation to decrease the rate at which heat is lost from the fuselage to the surrounding atmosphere via conduction and convection. Conversely, high-speed aircraft include insulation to decrease the rate at which heat moves from the skin of the aircraft to the fuselage of the aircraft. Other aircraft and aerospace components such as, for example, an airborne weapon such as a missile include one or more areas of insulation to protect thermally sensitive components such as electronics. In aircraft and/or aerospace applications, weight and size (e.g., thickness) of the insulation is an important consideration of the insulation to increase the payload capacity and to decrease fuel usage. More generally, insulation is used in a variety of applications where ease of application, thickness, and weight of the insulation are important considerations.

Disclosed herein are methods and apparatus for Layer-by-Layer (LBL) deposition to form dense and highly loaded insulation. For example, LBL can enable the insulation to have a concentration of more than 95% solids to be deposited. In examples disclosed herein, alternating layers (e.g., from aqueous solutions, from non-aqueous solutions, etc.) of solutions including particulates (e.g., particulate material(s)) are deposited from alternating anionic and cationic solutions on a substrate with each layer bonding with adjacent (e.g., above and below) layers. Excess fluids of the solutions are removed after each deposition to leave the newly deposited self-assembled monolayer. In examples disclosed herein, unused portions of the solutions including the particulates are recovered for use in subsequent layers. For example, an aqueous solution (e.g., a solution including water) and/or a non-aqueous solution (e.g., a solution including an inorganic or organic solvent, oils, polymers, etc.) can be implemented in connection with the methods disclosed herein.

Examples disclosed herein can implement alternating layers including one or more particulates including graphene (Gr), molybdenum diselenide ($MoSe_2$), molybdenum disulfide ($MoS_2$), and/or tungsten diselenide ($WSe_2$), etc. The difference in polarity between the particulate solutions and/or van der Waals interaction of the particulates facilitates the assembly (i.e., self-assembly) of layers. The relative difference in chemical and physical properties between alternating layers of the particulates such as atomic mass, mass density, and phonon vibrational modes contributes to an increased thermal resistance of assembled layers of the particulates. Layer-by-layer self-assembly forms layers of the necessary scale for these quantum-level effects to become active. For example, a first layer (e.g., a first layer of a particulate material such as tungsten diselenide) can be deposited upon a charged substrate composed of sulfur dioxide ($SO_2$). Subsequent layers of particulates such as molybdenum disulfide are deposited on the first layer to form an insulation coating.

The substrate can be a sulfur dioxide layer formed on an underlying structure (e.g., a component), such as the exterior of the fuselage of the aircraft. For example, a first charged solution including tungsten diselenide can be in a carrier fluid such as deionized water and can be deposited onto the sulfur dioxide substrate. To recover excess tungsten diselenide solution that did not bond with the substrate after the initial deposition, an external washing fluid is directed to the deposition site to wash off the excess solution. The excess solution can be collected for reuse (e.g., recycled).

To form a second layer, an oppositely charged solution such as, for example, a solution including molybdenum disulfide and a carrier fluid can be deposited onto the first layer. Like the first layer deposition, excess molybdenum disulfide solution can be collected by washing the deposition site to collect the excess molybdenum disulfide solution that did not bond to the first layer. Subsequent layers of oppositely charged solutions of particulates and carrier fluid(s) such as, for example, a molybdenum diselenide solution and a graphene solution can be deposited on the second layer and recovered to form subsequent layers. For example, the deposition of a preset number of layers can constitute a single application of the insulation coating. For example, the deposition of a first layer of tungsten diselenide, a second layer of molybdenum disulfide, a third layer of molybdenum diselenide, and a fourth layer of graphene can define a first application of LBL deposition. Subsequent applications of LBL deposition onto the first application can be completed to achieve desired insulation properties.

In some examples disclosed herein, environmental factors associated with the LBL deposition are monitored and/or adjusted for the process. For example, a deposition controller can direct an environment controller to regulate an environment of an LBL deposition site (e.g., a work cell, etc.). In some examples, the environment controller can regulate the environment for the LBL deposition based on a stage of the deposition, such as an initial spraying of solution, collection of excess solution, and/or post-processing (e.g., heating of remaining solution, etc.), etc.

Now turning to the figures, FIG. 1 illustrates an example aircraft 100 in which the examples disclosed herein can be implemented. The aircraft 100 of the illustrated example includes a tail section 101, a nose section (e.g., a cockpit section) 110, and wings 112 attached to a fuselage 114. The examples described herein can be applied to surfaces and/or features of any of the tail section 101, the nose section 110, the wings 112 and/or the fuselage 114, or any other exterior or outboard structure (e.g., a wing strut, an engine strut, a canard stabilizer, etc.) and/or surface of the aircraft 100.

The LBL deposition techniques disclosed herein can be applied to any suitable structure and/or component, including, for example, thermally sensitive components of a missile, a satellite, a land vehicle, a drone, etc. (e.g., a vehicle). More generally, the LBL deposition techniques disclosed herein can be implemented to form insulation for any structure and/or component (e.g., to deposit particulates on a surface). In some examples, a substrate (e.g., a substrate layer) composed of a low-cost material with the ability to withstand high temperatures such as sulfur dioxide is applied to the aircraft component such as the tail section 101, the nose section 110, the wings 112 and/or the fuselage 114 prior to the LBL deposition. In other examples, applications such as plasma treatment can be used to prepare a substrate on a component to receive a first layer.

Figure 2A:
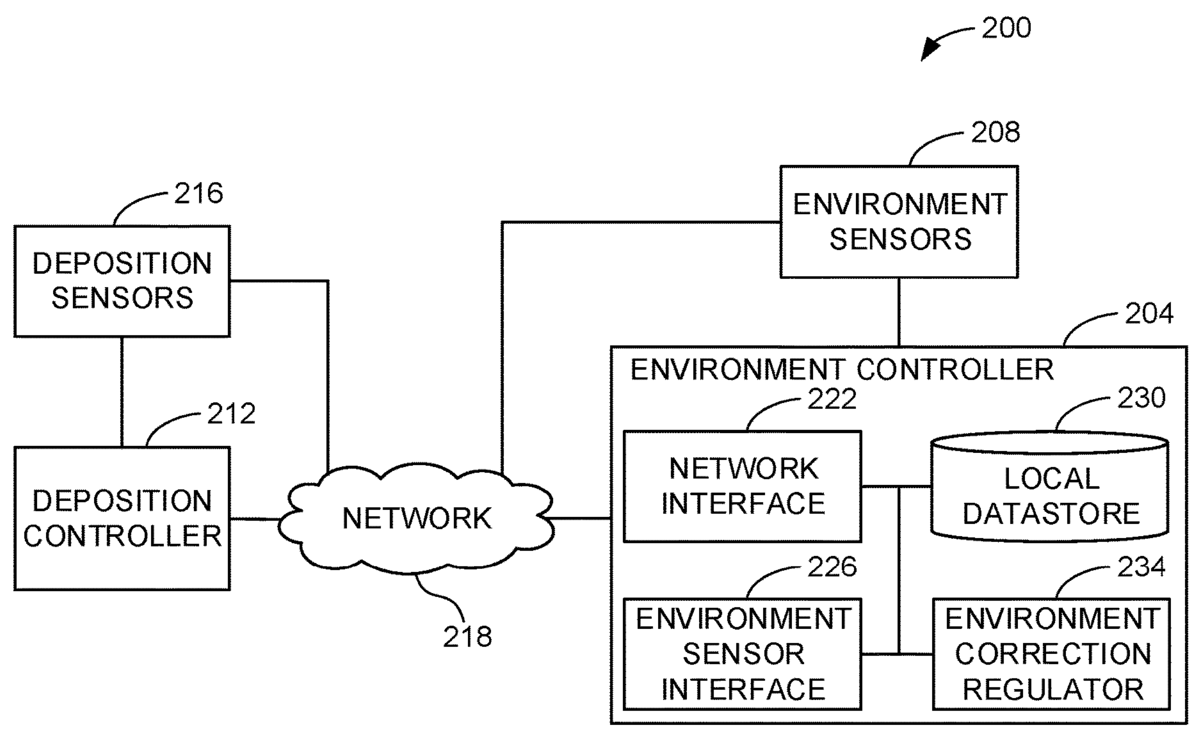
FIG. 2A is a system diagram illustrating an example environment controller, an example deposition controller, example deposition sensors, and example environment sensors that can be implemented in connection with the teachings of this disclosure for layer-by-layer deposition.

FIG. 2A is a system diagram illustrating an example system 200 including an example environment controller 204, example environment sensors 208, an example deposition controller 212, and example deposition sensors 216 that can be implemented in connection with the teachings of this disclosure for LBL deposition. In the example of FIG. 2A, the environment controller 204 can be communicatively coupled to the deposition controller 212 by way of an example network 218. However, in other examples, the deposition controller 212 can be communicatively coupled to the environment controller 204 via any suitable wired or wireless connection. The environment sensors 208 are communicatively coupled to the environment controller 204 and/or the network 218. Similarly, the deposition sensors 216 are communicatively coupled to the deposition controller 212 and/or the network 218.

In the illustrated example of FIG. 2A, the environment sensors 208 can include one or more temperature sensors, pressure sensors, humidity sensors, weight sensors, and/or other environment monitoring sensors, etc. to monitor an environment (e.g., a work cell, etc.) for LBL deposition. The environment controller 204 can access data from the environment sensors 208 and can, in turn, regulate the environment of an application site, the work cell, and/or a surrounding area, etc. The example environment controller 204 includes an example first network interface 222, an example environment sensor interface 226, an example first local datastore 230, and an example environment correction regulator 234.

In the illustrated example of FIG. 2A, the environment controller 204 includes the example first network interface 222 to facilitate a connection with the deposition controller 212 and/or the environment sensors 208. For example, the environment controller 204 can receive one or more commands from the deposition controller 212 and/or an external Human Machine Interface (HMI) regarding desired environment parameters for LBL deposition. For example, the environment controller 204 can receive a desired temperature from the deposition controller 212 for a particular LBL deposition application.

In the illustrated example of FIG. 2A, the example environment controller 204 includes the environment sensor interface 226. For example, the environment sensor interface 226 can be implemented additionally or alternatively to the first network interface 222 to access sensor data from the environment sensors 208. For example, the environment sensor interface 226 can access temperature data from an example temperature sensor, pressure data from an example pressure sensor, and/or example humidity data from an example humidity sensor, etc., regarding the application site, the work cell, and/or the surrounding area for LBL deposition. The environment sensor interface 226 can access data from the environment sensors via one or more wired or wireless connections.

In the illustrated example of FIG. 2A, the example environment controller 204 includes the example first local datastore 230. The first local datastore 230 can store environment sensor data accessed by the environment sensor interface 226 and/or the example first network interface 222. The first local datastore 230 can store, for example, one or more desired environment conditions accessed from the deposition controller 212.

In the illustrated example of FIG. 2A, the environment controller 204 includes the environment correction regulator 234. The environment correction regulator 234 can include Heating, Ventilation, and Air Conditioning (HVAC) regulators, pressure regulators, and/or humidity regulars, etc., in order to regulate the environment of LBL deposition to provide desired environment conditions. For example, the environment correction regulator 234 can actuate one or more heating elements to raise the temperature to a desired temperature, for example, for one or more post-processing steps of LBL deposition.

Figure 2B:
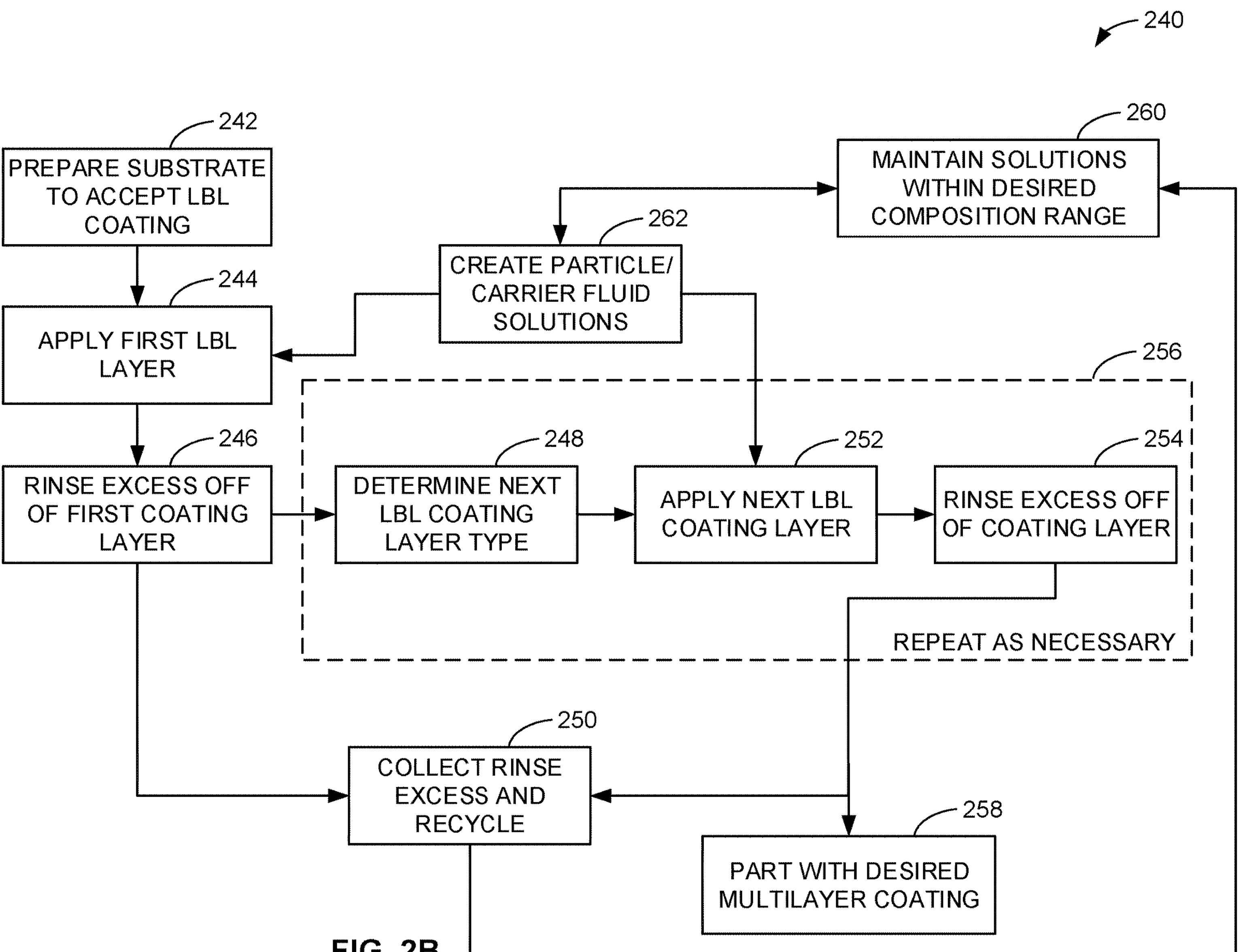
FIG. 2B is a block diagram of an example workflow for layer-by-layer deposition including example operations to form a coating on a component.

FIG. 2B is a block diagram of an example workflow 240 for layer-by-layer deposition including example operations to form a coating on a component. The workflow 240 or portion(s) thereof can be executed by at least one of the environment controller 204, the deposition controller 212 (both of FIG. 2A), human operator(s), and/or a combination thereof. The workflow 240 begins with an example first operation 242. In the first operation 242, a substrate is prepared to accept layer-by-layer coating and/or deposition. For example, a charged substrate layer of sulfur dioxide is prepared on an example component. Additionally or alternatively, for example, plasma treatment is used to prepare the surface of a component to receive a first layer (e.g., form a substrate on the component). After the first operation 242, the workflow 240 proceeds to an example second operation 244.

At the second operation 244 of the workflow 240, a first layer-by-layer coating layer (e.g., a first layer of a layer-by-layer deposition process, a first coating layer, etc.) is applied to the substrate. In the workflow 240, the first layer has an opposite charge relative to the charge of the substrate. For example, the first layer is applied by depositing a solution including particles of graphene, molybdenum diselenide, molybdenum disulfide, tungsten diselenide, and/or another suitable particulate material and a carrier fluid. For example, the solution is deposited by spraying the solution on the component or dipping the component in the solution. After the second operation 244, the workflow 240 proceeds to an example third operation 246.

At the third operation 246 of the workflow 240, the excess solution deposited in the second operation 244 to apply the first layer is rinsed off, for example, with deionized water. After the third operation 246, the workflow 240 proceeds to an example fourth operation 248 and to an example fifth operation 250 (e.g., in parallel).

At the fourth operation 248 of the workflow 240, a next layer-by-layer coating layer (e.g., a third layer, a fourth layer, a tenth layer, etc.) type is determined. For example, the composition of the next layer (graphene, molybdenum diselenide, molybdenum disulfide, and/or tungsten diselenide, etc.) is determined. After the fourth operation 248, the workflow 240 proceeds to an example sixth operation 252.

At the sixth operation 252 of the workflow 240, a next layer-by-layer coating layer (e.g., a next layer of a layer-by-layer deposition process, a next coating layer, etc.) is applied to the immediately previous layer. In the workflow 240, the next layer has an opposite charge relative to the charge of the previous layer. For example, the next layer is applied by depositing a solution including particles of graphene, molybdenum diselenide, molybdenum disulfide, and/or tungsten diselenide and a carrier fluid. For example, the solution is deposited by spraying the solution on the component or dipping the component in the solution. After the sixth operation 252, the workflow 240 proceeds to an example seventh operation 254.

At the seventh operation 254 of the workflow 240, the excess particulate solution deposited in the sixth operation 252 is rinsed off, for example, with deionized water. The fourth, sixth, and seventh operations 248, 252, 254, collectively, an example layer application iteration 256, can be iteratively repeated as necessary to deposit the desired quantity of layers for the layer-by-layer coating, repeating from the fourth operation 248. After the seventh operation 254, the workflow 240 proceeds to the example fifth operation 250 and to an example eighth operation 258 (e.g., in parallel). At the eighth operation 258 of the workflow 240, the part with the desired multilayer coating (e.g., layer-by-layer coating) is completed.

At the fifth operation 250 of the workflow 240, which proceeds after the third operation 246 and the seventh operation 254, the rinse excess is collected for recycling. For example, the solution including the particles and the carrier fluid that was rinsed off can be stored for layer deposition during another application of a layer wherein the same charge and particle material is desired. After the fifth operation 250, the workflow 240 proceeds to an example ninth operation 260.

At the ninth operation 260 of the workflow 240, solutions including particle and carrier fluid are maintained within a desired composition range. For example, a charged solution can include particle material (e.g., graphene, molybdenum diselenide, molybdenum disulfide, and/or tungsten diselenide) and a carrier fluid. The concentration of the particle material in the carrier fluid in the solution and the desired charge can be maintained in the ninth operation 260. For example, the composition and/or concentration of the solution can be maintained within a desired range encompassing a target composition and/or concentration. For example, there are two or more solutions corresponding to two or more particle materials. Each of the two or more solutions can be maintained. Before, after, or in parallel with the ninth operation 260, solution creation 262 of the workflow 240 occurs.

At the solution creation 262, the particles (e.g., the graphene, the molybdenum diselenide, the molybdenum disulfide, the tungsten diselenide, and/or another suitable particulate material) and a carrier-fluid solution is prepared. For example, the solution creation 262 of the solution to be deposited to apply the first layer (e.g., at the second operation 244) occurs before the application of the first layer at the second operation 244. Similarly, the solution creation 262 of the solution to be deposited to apply the sixth operation 252 of the next layer during a layer application iteration 256 occurs before the sixth operation 252. During solution creation, two or more solutions corresponding to two or more particles (e.g., ones of graphene, molybdenum diselenide, molybdenum disulfide, and/or tungsten diselenide) are created at or near a target composition and/or concentration.

Figure 3:
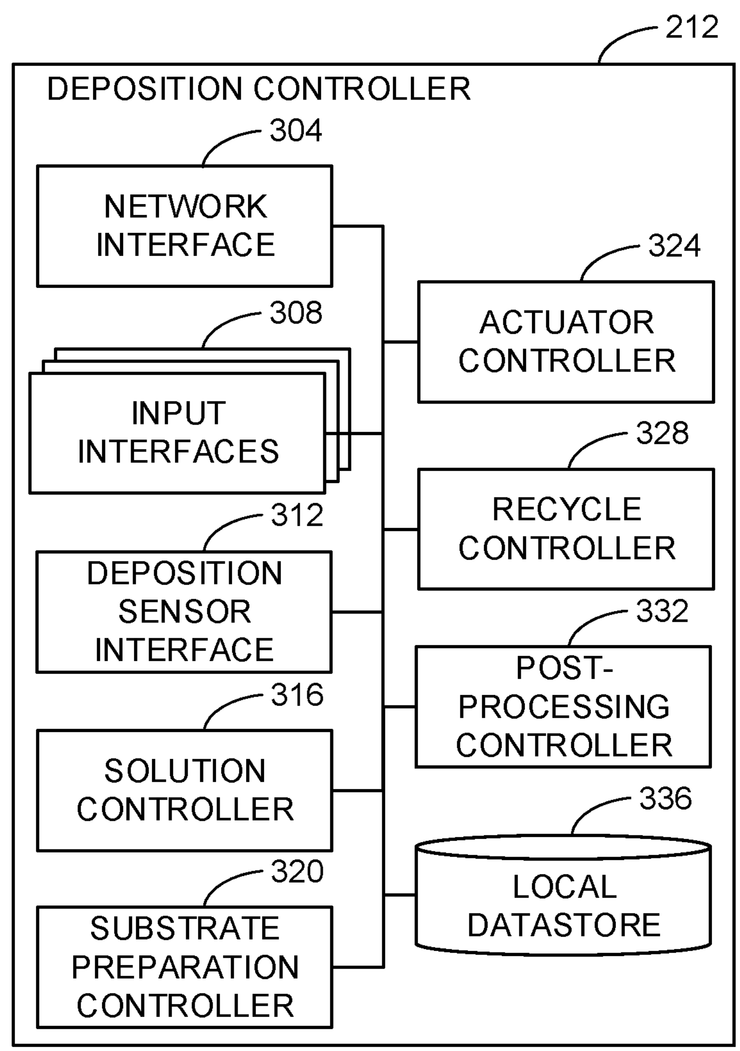
FIG. 3 is a block diagram of the example deposition controller of FIG. 2A.

FIG. 3 is a block diagram of the example deposition controller 212 of FIG. 2A. The example deposition controller 212 includes an example second network interface 304, example input interfaces 308, an example deposition sensor interface 312, an example solution controller 316, an example substrate preparation controller 320, an example actuator controller 324, an example recycle controller 328, an example post-processing controller 332, and an example second local datastore 336.

In the illustrated example of FIG. 3, the deposition controller 212 includes the example second network interface 304. The second network interface 304 can access and/or transmit environment conditions for the environment of an LBL deposition site and the surrounding area to or from the environment sensors 208 and/or the environment controller 204 via the network 218 of FIG. 2A.

In the illustrated example of FIG. 3, the deposition controller 212 includes one or more input interfaces 308. The input interfaces 308 can receive inputs regarding, for example, conditions, parameters, and materials for an LBL application via one or more HMIs. For example, the input interfaces 308 can access commands including the desired composition of the solutions for each layer of an LBL deposition application. The input interfaces 308 can access, for example, temperature information for post-processing, etc.

In the illustrated example of FIG. 3, the deposition controller 212 includes the solution controller 316. The solution controller 316 can prepare appropriate solutions including the particulates and the carrier fluids for each layer of LBL deposition application(s). For example, the solution controller 316 can prepare a graphene solution, a molybdenum diselenide solution, a molybdenum disulfide solution, and/or a tungsten diselenide solution including a carrier fluid. The solution controller 316 can ensure that there is an appropriate concentration of the particulates in the carrier fluid and/or an appropriate purity of the particulate and carrier fluid solution. In some examples, the solution controller 316 is implemented manually by, for example, a technician preparing appropriate particulate solutions ahead of LBL deposition.

In the illustrated example of FIG. 3, the deposition controller 212 includes the substrate preparation controller 320. The substrate preparation controller 320 can prepare a substrate in and/or on a component such as the tail section 101, the nose section 110, the wings 112 and/or the fuselage 114 of the aircraft 100 (all of FIG. 1) to have a charged surface to receive a first layer of LBL deposition. In some examples, the substrate preparation controller 320 can deposit a charged substrate layer of sulfur dioxide on the component. In other examples, the substrate preparation controller 320 can implement plasma treatment to prepare the surface of the component to receive a first layer (e.g., form a substrate on the component).

In the illustrated example of FIG. 3, the deposition controller 212 includes the actuator controller 324. The actuator controller 324 can actuate one or more nozzles to deposit an appropriate amount of a particulate solution for a layer of LBL deposition and/or to deposit particulate solution at a specified flow rate. The actuator controller 324 can actuate the one or more nozzles to translate and/or rotate to appropriately cover the component with the solution for the layer. In some examples, robotic actuators (e.g., four robotic actuators) can surround a component and can direct (e.g., spray) the solution towards the component from different directions via spray heads and/or printing heads. In some other examples, spray nozzles on a nozzle manifold can direct the solution towards the component. Additionally or alternatively, roll-to-roll (R2R) coating may be used. The roll can later be applied to the component as insulation.

In the illustrated example of FIG. 3, the deposition controller 212 includes the recycle controller 328. The recycle controller 328 can collect excess particulate solution from an initial spraying of LBL solution and can store the collected excess solution for reuse. For example, the recycle controller 328 can actuate a nozzle to direct a washing fluid to the layer to rinse off excess solution from an initial LBL layer deposition. The solution can then be recovered for reuse in a subsequent deposition of a layer formed with the particulate solution.

In the illustrated example of FIG. 3, the deposition controller 212 includes the post-processing controller 332. The post-processing controller 332 can apply one or more post-processing treatments to one or more deposited layers. For example, the post-processing controller 332 can heat one or more layers through a targeted heating element and/or can heat the work cell containing the component to, further bond the layers.

In the illustrated example of FIG. 3, the deposition controller 212 includes the second local datastore 336. The second local datastore 336 can store environment sensor data accessed from the environment sensors 208 and/or deposition sensor data accessed from the deposition sensors 216. The second local datastore 336 can store instructions and/or parameters associated with LBL deposition including particulate selection and parameters, substrate selection, actuator selection and parameters, solution recycling selection and parameters, post-processing selection and parameters, etc., from the input interfaces 308.

While an example manner of implementing the example environment controller 204 is illustrated in FIG. 2A and the example deposition controller 212 is illustrated in FIGS. 2A and/or 3, one or more of the elements, processes and/or devices illustrated in FIGS. 2A and/or 3 may be combined, divided, re-arranged, omitted, eliminated and/or implemented in any other way. Further, the example first network interface 222, the example environment sensor interface 226, the example environment correction regulator 234, and/or, more generally, the example environmental controller 204 of FIG. 2A and/or the example second network interface 304, the example input interfaces 308, the example deposition sensor interface 312, the example solution controller 316, the example substrate preparation controller 320, the example actuator controller 324, the example recycle controller 328, the example post-processing controller 332, and/or, more generally, the example deposition controller 212 of FIGS. 2A and/or 3 may be implemented by hardware, software, firmware and/or any combination of hardware, software and/or firmware. Thus, for example, any of the example first network interface 222, the example environment sensor interface 226, the example environment correction regulator 234, and/or, more generally, the example environmental controller 204 of FIG. 2A and/or the example second network interface 304, the example input interfaces 308, the example deposition sensor interface 312, the example solution controller 316, the example substrate preparation controller 320, the example actuator controller 324, the example recycle controller 328, the example post-processing controller 332, and/or, more generally, the example deposition controller 212 of FIGS. 2A and/or 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first network interface 222, the example environment sensor interface 226, the example environment correction regulator 234, and/or, more generally, the example environmental controller 204 of FIG. 2A and/or the example second network interface 304, the example input interfaces 308, the example deposition sensor interface 312, the example solution controller 316, the example substrate preparation controller 320, the example actuator controller 324, the example recycle controller 328, the example post-processing controller 332, and/or, more generally, the example deposition controller 212 of FIGS. 2A and/or 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example environment controller 204 of FIG. 2A and/or the example deposition controller 212 of FIGS. 2A and/or 3 may include one or more elements, processes and/or devices in addition to, or instead of, those illustrated in FIGS. 2A and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
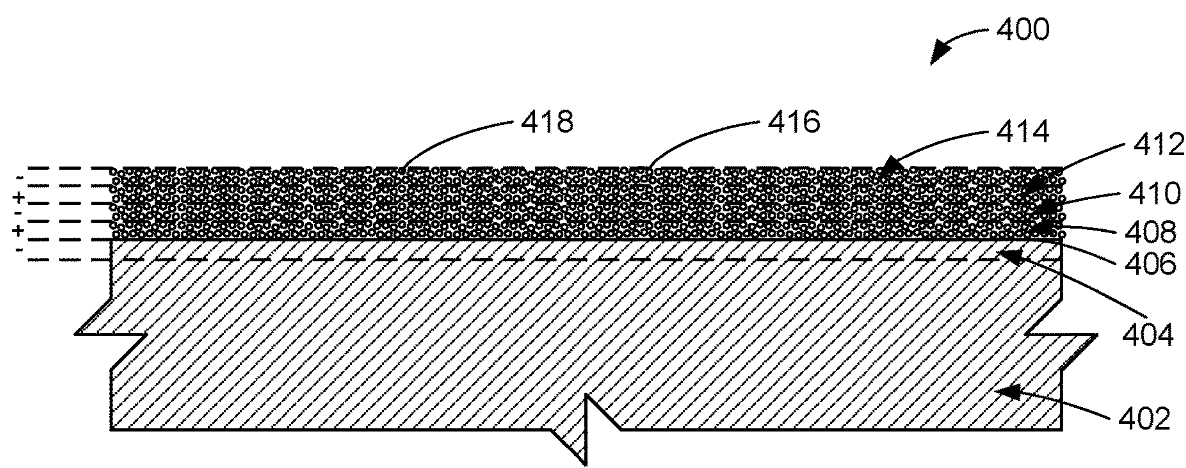
FIG. 4 is a cross section of an example insulation coating formed by layer-by-layer deposition.

FIG. 4 is a cross-section of an example insulation coating 400 formed by an LBL deposition application. In the illustrated example of FIG. 4, the insulation coating 400 is formed on an example component 402. For example, the component 402 can include any of the tail section 101, the nose section 110, the wings 112 and/or the fuselage 114 of the aircraft 100 (all of FIG. 1). For example, the component 402 can include an aluminum alloy and/or another metal or composite for aerospace applications. In the example of FIG. 4, the component 402 includes an example substrate portion 404 (e.g., a substrate 404) having a negative charge. In some examples, the substrate preparation controller 320 (FIG. 3) applies a plasma treatment to an example surface 406 of the substrate portion 404 to form a charge such as a negative charge on the substrate portion 404. In some examples, an operator (e.g., a technician, assembly or manufacturing personnel, a worker, etc.) applies a plasma treatment to the surface 406 of the substrate portion 404 to form a charge such as a negative charge on the substrate portion 404. Though the substrate portion 404 is shown integral with the component 402 in the example of FIG. 4, in other examples, the substrate portion 404 can be a substrate layer 404 on the component 402. For example, the substrate preparation controller 320 and/or the operator can apply the substrate layer 404 composed of sulfur dioxide to the component 402 to form a charged substrate on the component 402.

In the illustrated example of FIG. 4, a first layer 408 is formed on the substrate portion 404 of the component 402. For example, to form the first layer 408, a solution having a positive charge (e.g., a cationic solution) including particulates and a carrier fluid is deposited onto the charged surface 406 of the substrate portion 404. Through self-assembly, a portion of the solution bonds to the charged substrate. Excess of the solution is washed off and is recycled. Example methods for forming the insulation coating 400 are discussed in further detail in connection with FIGS. 5 and/or 6. In the example of FIG. 4, the first layer 408 is composed of tungsten diselenide having a positive charge. In other examples, the first layer 408 can be formed from another particulate such as, for example, graphene, molybdenum diselenide, molybdenum disulfide, aluminum oxide ($Al_2O_3$), and/or zirconium dioxide ($ZrO_2$), etc.

A second layer 410 is formed on the first layer 408. For example, to form the second layer 410, a solution having a negative charge (e.g., an anionic solution) including particulates and a carrier fluid is deposited on the first layer 408 and the excess solution is washed and recycled. In the illustrated example of FIG. 4, the second layer 410 has a negative charge (e.g., the same charge as the substrate portion 404) to promote bonding of the second layer 410 with the first layer 408. The particulate solution for the second layer 410 can have a negative charge by way of electrostatic forces. In FIG. 4, the second layer 410 is composed of molybdenum disulfide. In other examples, the second layer 410 can be formed from another particulate.

A third layer 412 is formed on the second layer 410. In some examples of FIG. 4, the third layer 412 has a positive charge and is composed of molybdenum diselenide. In some examples, the third layer 412 has a positive charge and is composed of tungsten diselenide. In other examples, the third layer 412 can be formed from another particulate.

A fourth layer 414 is formed on the third layer 412. In the illustrated example of FIG. 4, the fourth layer 414 has a negative charge and is composed of graphene. In other examples, the fourth layer 414 can have other appropriate compositions. In the illustrated example of FIG. 4, the interactions of the layers 408-414 provides for increased insulation properties to the component 402 relative to homogenous insulation. In FIG. 4, subsequent applications of the layers 408-414 can be applied to a top surface 416 of the fourth layer 414 to further increase the insulation to the component 402. Though macroscopic representations of particulates 418 are shown in FIG. 4 for convenience, the layers 408-414 are microscopic and/or nanoscopic and arranged according to the composition and bonding between the particulates 418 of the layers 408-414.

In other examples disclosed herein, other combinations of particulates 418 can be formed by LBL deposition to form the insulation coating 400. For example, another example insulation coating 400 consistent with this disclosure can include other combinations of particulates 418 such as graphene, molybdenum diselenide, molybdenum disulfide, aluminum oxide, and/or zirconium dioxide, etc., arranged on a substrate such as silicon dioxide and/or silicon, etc.

Figure 5:
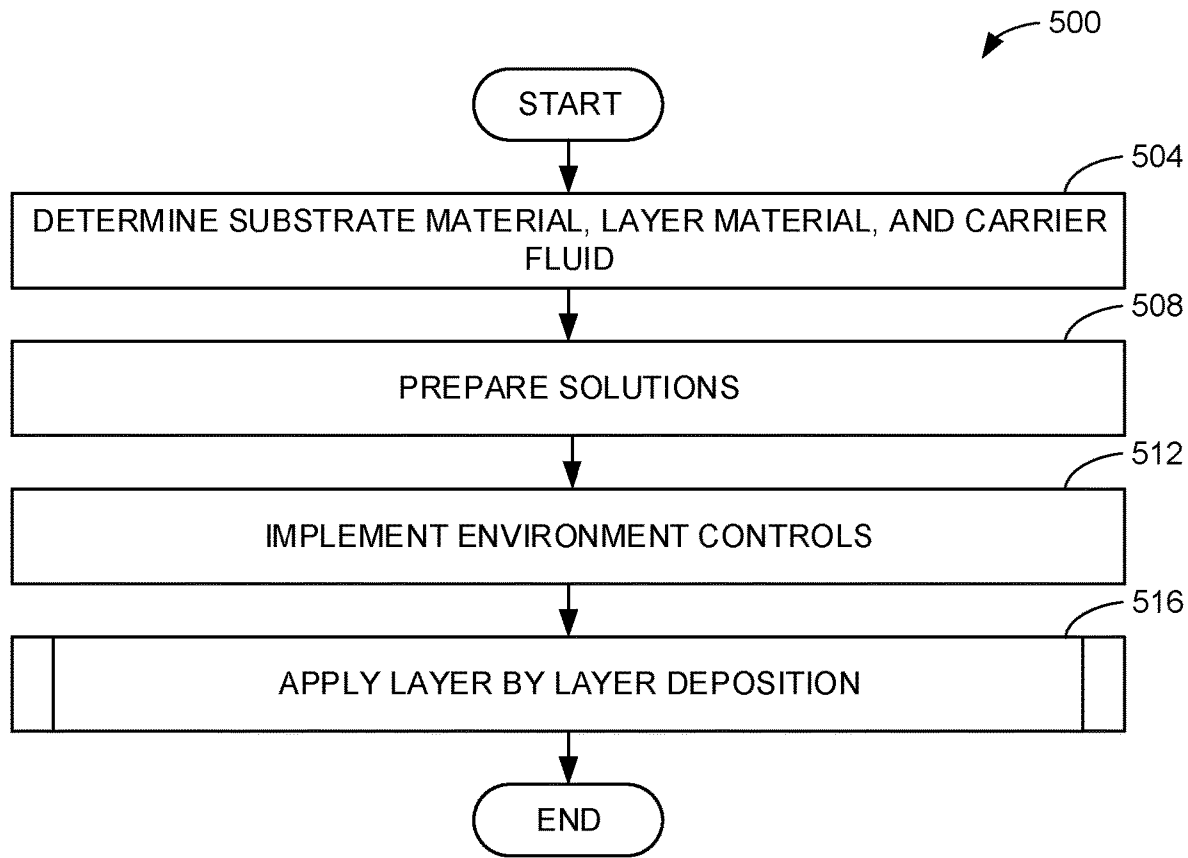
FIG. 5 is a flowchart representative of machine-readable instructions which can be executed to implement the environment controller of FIG. 2A and/or the deposition controller of FIGS. 2A and/or 3 to prepare for and apply layer-by-layer deposition to form the example insulation coating of FIG. 4.

Flowcharts representative of example hardware logic, machine-readable instructions, hardware implemented state machines, and/or any combination thereof for implementing the environment controller 204 of FIG. 2A and/or the deposition controller 212 of FIGS. 2A and/or 3 are shown in FIGS. 5 and/or 6. The machine-readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5 and/or 6, many other methods of implementing the example environment controller 204 of FIG. 2A and/or the deposition controller 212 of FIGS. 2A and/or 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine-readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Additionally or alternatively, one or more aspects of the processes of FIGS. 5 and/or 6 can be implemented by an operator assisted by one or more electrical, mechanical, and/or electro-mechanical tools "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., “a”, “an”, “first”, “second”, etc.) do not exclude a plurality. The term “a” or “an” entity, as used herein, refers to one or more of that entity. The terms “a” (or “an”), “one or more”, and “at least one” can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of a process 500 which can be implement the environment controller 204 of FIG. 2A and/or the deposition controller 212 of FIGS. 2A and/or 3 to prepare for and apply LBL deposition to form the example insulation coating 400 of FIG. 4. For example, the process 500 can be representative of executable instructions. In some examples, additionally or alternatively, an operator implements the process 500 to prepare for and apply LBL deposition to form the example insulation coating 400 of FIG. 4. In some examples, the process 500 begins when the deposition controller 212 determines substrate material, particulate material for one or more layers, and carrier fluid for an LBL deposition application. (Block 504). In FIG. 5, the material of the substrate portion 404 (FIG. 4), the particulates for one or more of the layers 408-414 (all of FIG. 4), and/or the carrier fluid can be inputs to the deposition controller 212 via the input interfaces 308 (FIG. 3) from one or more HMIs. In other examples, the material of the substrate portion 404, the material for one or more of the layers 408-414, and/or the carrier fluid can be predetermined and/or preprogrammed onto the deposition controller 212. Additionally or alternatively, the deposition controller 212 can determine appropriate material of the substrate portion 404, material for one or more of the layers 408-414, and/or the carrier fluid according to, for example, desired insulation characteristics of the insulation coating 400. In some examples, additionally or alternatively, the operator determines substrate material, particulate material for one or more layers, and carrier fluid for LBL deposition.

The solution controller 316 (FIG. 3) and/or the operator prepares charged solutions for LBL deposition. (Block 508). In some examples, the solution controller 316 prepares the particulate solutions in connection with the process 500. Additionally or alternatively, the solution controller 316 and/or the operator can access pre-prepared particulate solutions. For example, each prepared solution can be an anionic solution or a cationic solution and can include a particulate and a carrier fluid such as deionized water. For example, the solution controller 316 and/or the operator prepares a first solution including tungsten diselenide and deionized water, second solution including molybdenum disulfide and deionized water, third solution including molybdenum diselenide and deionized water, and a fourth solution including graphene and deionized water. The solution controller 316 and/or the operator also prepares washing fluid for the LBL deposition.

The environment controller 204 implements the environmental controls for the LBL deposition. (Block 512). The environment correction regulator 234 receives temperature data, pressure data, and/or humidity data, etc., from the environment sensors 208 and in turn regulates an environment such as a work cell for LBL deposition. The environment correction regulator 234 can regulate environment aspects of the work cell to establish desired conditions for LBL deposition such as a desired temperature, pressure, and humidity. In some examples, the environment correction regulator 234 continues to regulate the temperature of the environment such as the work cell for LBL deposition during the application and finishing of layers such as the layers 408-414. In some examples, the process 500 is applied at ambient conditions wherein no environment regulation and/or a portion of the environment regulation are used.

The deposition controller 212 and/or the operator applies an LBL deposition application to form the insulation coating 400. (Block 516). The application of LBL deposition is discussed in further detail in connection with FIG. 6. After block 516, the machine-readable instructions 500 end.

Figure 6:
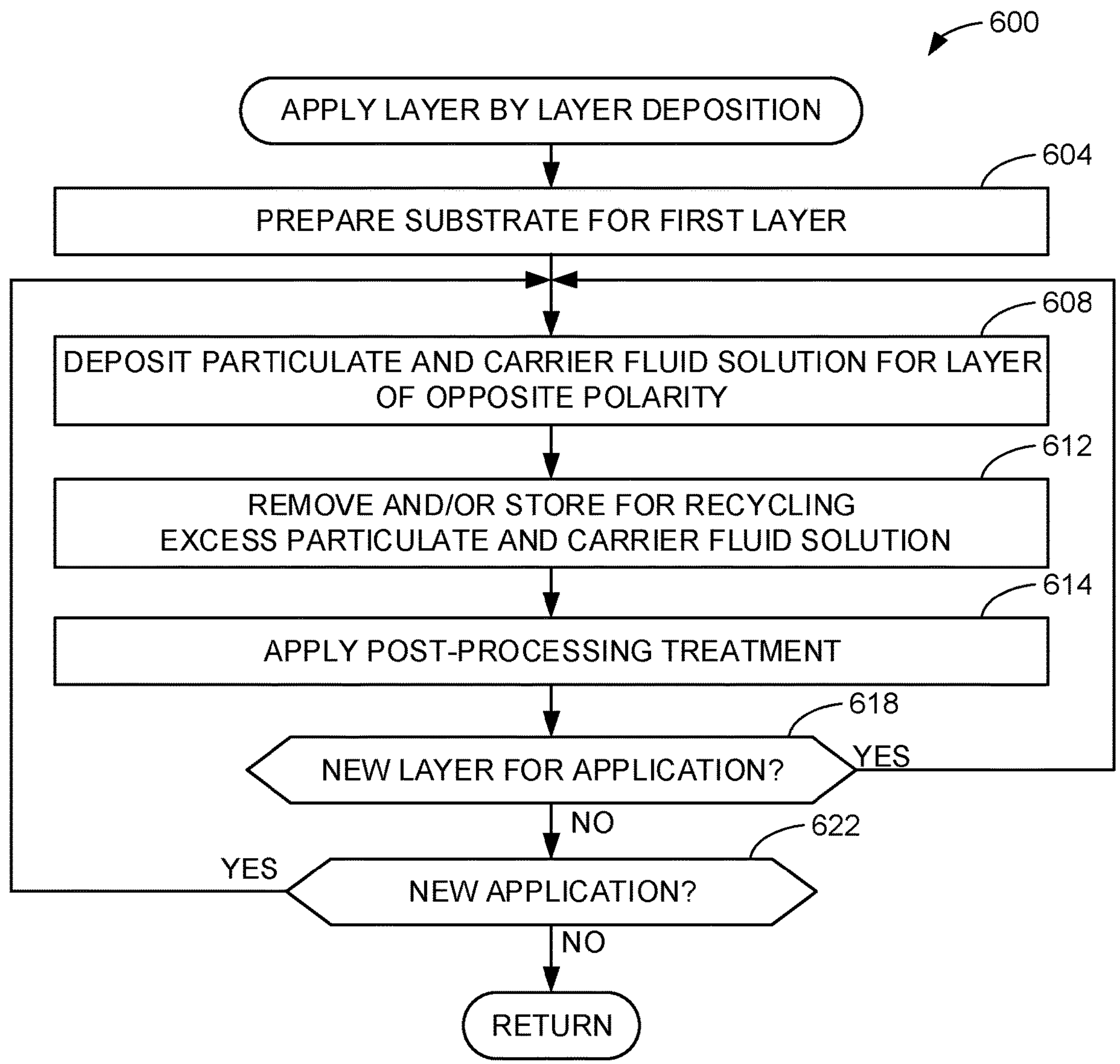
FIG. 6 is a flowchart representative of machine-readable instructions which may be executed to implement the deposition controller of FIGS. 2A and/or 3 to apply layer-by-layer deposition to form the example insulation coating of FIG. 4.

FIG. 6 is a flowchart representative of a process 600 which may implement the deposition controller 212 of FIGS. 2A and/or 3 to apply LBL deposition to form the example insulation coating 400 of FIG. 4. For example, the process 600 can be machine-executable instructions 600. In some examples, additionally or alternatively, the operator implements the process 600 to apply LBL deposition to form the example insulation coating 400 of FIG. 4. In the illustrated example of FIG. 6, process 600 is implemented in connection with block 516 of the process 500 of FIG. 5 to apply LBL deposition.

The machine-readable instructions 600 begin when the substrate preparation controller 320 (FIG. 3) and/or the operator prepares the substrate to receive the first layer 408 (FIG. 4). (Block 604). In some examples, the substrate preparation controller 320 applies a plasma treatment to an exposed face of the component 402 in order to form the charged surface 406 on the substrate portion 404 (all three of FIG. 4). In some examples, the operator applies the plasma treatment (e.g., with a plasma etching tool, etc.) to an exposed face of the component 402 in order to form the charged surface 406. In other examples, the substrate preparation controller 320 and/or the operator deposits a substrate layer 404 (e.g., a Silicon dioxide layer). In yet other examples, the substrate preparation controller 320 and/or the operator implements another suitable mechanical, chemical, or deposition surface treatment to the component 402 to create the charged surface 406. In some examples, at block 604, the substrate preparation controller 320 and/or the operator can form the substrate layer 404 on an aircraft component 402 by applying a chemical treatment to the aircraft component 402. In some examples, at block 604, the substrate preparation controller 320 and/or the operator can chemically treat a surface to form the substrate 404 or mechanically treat the surface to form the substrate 404. In some examples, at block 604, the substrate preparation controller 320 and/or the operator can prepare an aircraft component 402 by at least one of applying a chemical treatment to form a substrate 404 or applying a mechanical treatment to form the substrate 404, the substrate 404 having a first charge.

In some examples the actuator controller 324 (FIG. 3) and/or the operator directs one or more actuators to deposit a particulate and carrier-fluid solution of opposite polarity to the substrate portion 404 and/or the previous layer. (Block 608). For example, one or more spray heads and/or printing heads positioned on a manifold and/or one or more robotic actuators (e.g., a programmable linkage having one or more nozzles proximate its free end) can deposit the solution. For example, the actuator controller 324 and/or the operator can direct the nozzles to deposit a quantity of a tungsten diselenide solution onto the charged surface 406 to begin the formation of the first layer 408. The nozzles can, for example, transform the solution into a fine mist such that the particulate solution is distributed evenly when it is sprayed on to the component 402. In some examples, additionally or alternatively, the operator can dip a portion or whole of the component 402 into the charged solution. In some examples, additionally or alternatively, the operator can spray the component 402 with the charged solution via a handheld spraying tool.

In some examples, at block 608, the actuator controller 324 can direct one or more actuators to deposit a first solution and/or the operator can deposit the first solution onto the substrate 404 (e.g., the substrate portion 404) on an aircraft surface, the substrate 404 having a first charge (e.g., a negative charge), the first solution having a second charge opposite the first charge (e.g., a positive charge), the first solution including a carrier fluid (e.g., de-ionized water). In some of these examples, at block 608 at a second iteration in the machine-readable instructions 600, the actuator controller 324 can direct the one or more actuators to deposit a second solution (e.g., a molybdenum disulfide solution) and/or the operator can deposit the second solution on the first layer 408, the second solution having the first charge (e.g., a positive charge), the second solution including the carrier fluid (e.g., the de-ionized water). In some of these examples, at block 608 at a third iteration in the machine-readable instructions 600, the actuator controller 324 can direct the one or more actuators to deposit the first solution and/or the operator can deposit the first solution on the second layer 410, the first solution including at least a portion of the first amount of the first solution.

In some examples, at block 608, the actuator controller 324 can direct one or more actuators to apply a first amount of a first aqueous solution and/or the operator can apply the first amount of the first aqueous solution to the substrate 404 in a first layer deposition, the first aqueous solution including a particulate and a carrier fluid. In some of these examples, at block 608 at a second iteration in the machine-readable instructions 600, the actuator controller 324 can direct the one or more actuators to apply a third amount of a second aqueous solution to the first layer 408 in a second layer deposition, the second aqueous solution including particulate material and the carrier fluid, the third amount different than a second amount. Additionally or alternatively, a non-aqueous solution (e.g., a solution including an inorganic or organic solvent, oils, polymers, etc.) can be implemented in connection with the machine-readable instructions 600.

In some examples, at block 608, the actuator controller 324 can direct one or more actuators to deposit a first aqueous solution and/or the operator can deposit the first aqueous solution on the substrate 404, the first aqueous solution having a second charge opposite a first charge. In some of these examples, at block 608 at a second iteration in the machine-readable instructions 600, the actuator controller 324 can direct one or more actuators to deposit a second aqueous solution and/or the operator can deposit the second aqueous solution on the first layer 408, the second aqueous solution having the first charge. In some of these examples, at block 608 at a third iteration in the machine-readable instructions 600, the actuator controller 324 can direct one or more actuators to at least partially deposit a recovered first portion of the first aqueous solution and/or the operator can deposit a recovered first portion of the first aqueous solution on the second layer 410.

The recycle controller 328 (FIG. 3) and/or the operator removes and/or stores for recycling excess particulate and carrier-fluid solution. (Block 612). In some examples, the recycle controller 328 directs the actuators to direct (e.g., spray) washing fluid (e.g., deionized water) towards the component 402 to remove (e.g., wash) a portion of the solution applied at block 608 that did not bond to the substrate and/or previous layer. In some examples, the operator sprays the washing fluid towards the component 402 via a handheld spraying tool. The recycle controller 328, the operator, and/or one or more structural elements can channel the recovered solution to a dedicated storage vessel for the solution (e.g., a tungsten diselenide storage vessel for a tungsten diselenide solution, a molybdenum diselenide storage vessel for a molybdenum diselenide solution, a molybdenum disulfide storage vessel for a molybdenum disulfide solution, a graphene storage vessel for a graphene solution, etc.). If four layers (e.g. the layers 408-414) are to be deposited for a single application, the recycled particulate solution for the first layer (e.g., the first layer 408) will be deposited again for the fifth layer in a second application, the recycled particulate solution for the second layer (e.g., the second layer 410) will be deposited again for the sixth layer in the second application, etc.

The recycle controller 328 and/or the operator can access data from the deposition sensors 216 regarding the recovered solution. For example, the recycle controller 328 and/or the operator can continue to remove and recover excess of the applied solution until a desired amount of the solution is recovered for reuse. In some examples, a work cell containing the environment for the LBL deposition includes one or more drains (e.g., structural elements) to recover excess of the applied solution. In these examples, the work cell can include one or more valves to direct the solution to an appropriate storage vessel for the solution.

In some examples, at block 612, the recycle controller 328 and/or the operator can remove a first amount of the first solution deposited on the substrate 404. In some of these examples, at block 612 at a second iteration in the machine-readable instructions 600, the recycle controller 328 and/or the operator can remove a second amount of the second solution deposited on the first layer 408. In some of these examples, at block 612 at a third iteration in the machine-readable instructions 600, the recycle controller 328 and/or the operator can remove a third amount of the first solution deposited on the second layer 410.

In some examples, at block 612, the recycle controller 328 and/or the operator can remove and store a second amount of the first aqueous solution from the first amount of the first aqueous solution applied to the substrate 404. In some of these examples, at block 612 at a second iteration in the machine-readable instructions 600, the recycle controller 328 and/or the operator can remove and store a fourth amount of the second aqueous solution from the third amount of the second aqueous solution applied to the first layer 408.

In some examples, at block 612, the recycle controller 328 and/or the operator can remove a first portion of first aqueous solution deposited on the substrate 404. In some of these examples, at block 612 at a second iteration in the machine-readable instructions 600, the recycle controller 328 and/or the operator can remove a second portion of second aqueous solution deposited on the first layer 408.

In some examples, the post-processing controller 332 (FIG. 3) applies one or more post-processing treatments. (Block 614). For example, the deposition site can be heated via direct heating elements to further bond two or more layers together. Additionally or alternatively, the post-processing controller 332 can direct the environment controller 204 to heat the work cell and/or the operator can heat the work cell via one or more HVAC regulators to promote further bonding between the layers. In other examples, the post-processing controller 332 can implement one or more chemical treatments to promote further bonding between the layers. In some examples, the post-processing treatment(s) of block 614 are applied only after a predetermined number of layers have been applied (e.g., one application) and/or to finish the insulation coating 400. In some examples, no post-processing treatment(s) are applied in connection with the process 600.

The deposition controller 212 and/or the operator then determines if another layer is to be applied for the insulation coating 400. (Block 618). If the desired layers for an application of the insulation coating 400 have not yet been applied and one or more new layers are to be deposited (e.g., block 618 returns YES), the process 600 repeats from block 608 to deposit a particulate solution of the opposite charge. If the desired layers (e.g., the layers 408-414) for an application of the insulation coating 400 have been applied (e.g., block 618 returns NO), the process 600 proceed to block 622.

The deposition controller 212 and/or the operator determines if another application of the insulation coating 400 is to be applied to the component 402. (Block 622). If more applications of the insulation coating 400 are to be applied (e.g., block 622 returns YES), the process 600 repeat from block 608. Additionally or alternatively, more layers can be deposited onto the component 402 immediately and/or without applying an entire new application. If no more applications of the insulation coating 400 are to be applied to the component 402 (e.g. block 622 returns YES), the process 600 ends and control returns to block 516 of the process 500 of FIG. 5.

Some examples disclosed herein include depositing a first solution (e.g., a tungsten diselenide solution) on a substrate (e.g., the substrate portion 404 and/or the component 402), the substrate having a first charge (e.g., a negative charge), the first solution having a second charge opposite the first charge (e.g., a positive charge), the first solution including a carrier fluid (e.g., de-ionized water), removing a first amount of the first solution deposited on the substrate to form a first layer (e.g., the first layer 408) on the substrate, depositing a second solution (e.g., a molybdenum disulfide solution) on the first layer, the second solution having the first charge, the second solution including the carrier fluid, and removing a second amount of the second solution deposited on the first layer to form a second layer (e.g., the second layer 410) on the first layer. Some examples disclosed herein include depositing the first solution (e.g., the tungsten diselenide solution) on the second layer (e.g., second layer 410) the first solution including at least a portion of the first amount of the first solution, removing a third amount of the first solution deposited on the second layer to form a third layer (e.g., the third layer 412) on the second layer.

In some examples, the first layer (e.g., the first layer 408) and the second layer (e.g., the second layer 410) provide increased insulation properties relative to layers formed by deposition of solutions of the same charge. Depositing the first solution (e.g., the tungsten diselenide solution) can include spraying the first solution and depositing the second solution (e.g., the molybdenum disulfide solution) can include spraying the second solution. The first and second solutions (e.g., the tungsten diselenide solution and the molybdenum solution) can each be deposited by a roll-to-roll process. Depositing the first solution (e.g., the tungsten diselenide solution) can further include heating the first and second layers to a second temperature higher the first temperature. The substrate (e.g., the substrate portion 404) can be a substrate layer (e.g., a substrate layer 404), and the substrate layer (e.g., the substrate layer 404) can be formed on an aircraft component including the aircraft surface by applying a chemical treatment to the aircraft component (e.g., the component 402). The substrate layer (e.g., the substrate layer 404) can include silicon dioxide.

Figure 7:
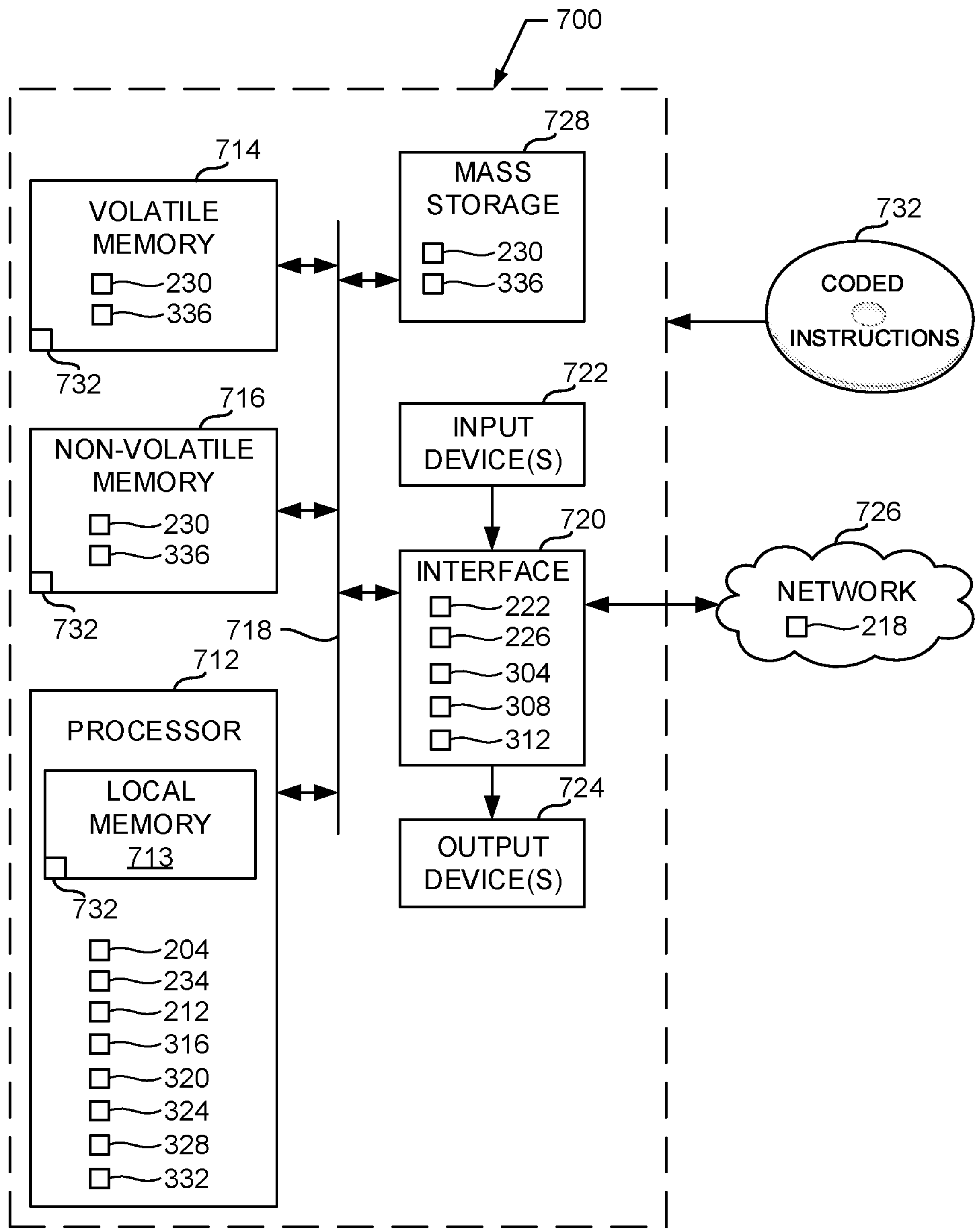
FIG. 7 is a block diagram of an example processing platform structured to execute the instructions of FIGS. 5 and/or 6.

FIG. 7 is a block diagram of an example processor platform 700 structured to execute the instructions of FIGS. 5 and/or 6 to implement the environment controller 204 of FIG. 2A and/or the deposition controller 212 of FIGS. 2A and/or 3. The processor platform 700 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the environment correction regulator 234 and/or, more generally, the environment controller 204 of FIG. 2A, and/or the solution controller 316, the substrate preparation controller 320, the actuator controller 324, the recycle controller 328, the post-processing controller 332, and/or, more generally, the deposition controller 212 of FIGS. 2A and/or 3.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface. In the illustrated example of FIG. 7, the interface circuit 720 implements the first network interface 222 and/or the environment sensor interface 226 of FIG. 2A, and/or the second network interface 304, the input interfaces 308, and/or the deposition sensor interface 312 of FIG. 3.

In the illustrated example, one or more input devices 722 are connected to the interface circuit 720. The input device (s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc. In the illustrated example of FIG. 7, the network 726 implements the network 218 of FIG. 2

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In the illustrated example of FIG. 7, the volatile memory 714, the non-volatile memory 716, and/or the mass storage 728 can implement the first local datastore 230 and/or the second local datastore 336.

The machine executable instructions 732 of FIGS. 5 and/or 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed for layer-by-layer deposition, including depositing a first solution including carrier fluid of a first polarity onto a prepared substrate of a second polarity, washing the deposition site to remove excess of the first solution, recovering the excess of the first solution for recycling to form a first layer on the substrate. The example methods, apparatus and articles of manufacture further include depositing a second solution including carrier fluid of the second polarity onto the first layer, washing the deposition site to remove excess of the second solution, recovering the excess of the second solution for recycling to form a second layer on the first layer.

Example methods and apparatus for Layer-by-Layer deposition are disclosed. Further examples and combinations thereof include the following:

Example 1 includes a method to prepare an aircraft surface, comprising depositing a first solution on a substrate on the aircraft surface, the substrate having a first charge, the first solution having a second charge opposite the first charge, the first solution including a carrier fluid, removing a first amount of the first solution deposited on the substrate to form a first layer on the substrate, depositing a second solution on the first layer, the second solution having the first charge, the second solution including the carrier fluid, and removing a second amount of the second solution deposited on the first layer to form a second layer on the first layer to prepare the aircraft surface.

Example 2 includes the method of example 1, further including depositing the first solution on the second layer, the first solution including at least a portion of the first amount of the first solution, removing a third amount of the first solution deposited on the second layer to form a third layer on the second layer.

Example 3 includes the method of example 1, wherein the first layer and the second layer provide increased insulation properties relative to layers formed by deposition of solutions of the same charge.

Example 4 includes the method of example 1, wherein the first and second solutions each include at least one of graphene, molybdenum diselenide, molybdenum disulfide, or tungsten diselenide.

Example 5 includes the method of example 1, wherein depositing the first solution includes spraying the first solution and depositing the second solution includes spraying the second solution.

Example 6 includes the method of example 1, wherein the first and second solutions are each deposited by a roll-to-roll process.

Example 7 includes the method of example 1, wherein depositing the first solution occurs at a first temperature, and further including heating the first and second layers to a second temperature higher the first temperature.

Example 8 includes the method of example 1, wherein the substrate is a substrate layer, and further including forming the substrate layer on an aircraft component including the aircraft surface by applying a chemical treatment to the aircraft component.

Example 9 includes the method of example 8, wherein the substrate layer includes silicon dioxide.

Example 10 includes a method to prepare an aircraft surface, comprising applying a first amount of a first aqueous solution to a substrate in a first layer deposition, the first aqueous solution including particulate material and a carrier fluid, removing and storing a second amount of the first aqueous solution from the first amount of the first aqueous solution applied to the substrate to form a first layer on the substrate, applying a third amount of a second aqueous solution to the first layer in a second layer deposition, the second aqueous solution including the particulate material and the carrier fluid, the third amount different than the second amount, and removing and storing a fourth amount of the second aqueous solution from the third amount of the second aqueous solution applied to the first layer to form a second layer on the first layer, the first and second layers forming at least a portion of a coating on the aircraft surface.

Example 11 includes the method of example 10, the method further including at least one of chemically treating a surface to form the substrate or mechanically treating the surface to form the substrate.

Example 12 includes the method of example 11, wherein the first aqueous solution is a cationic aqueous solution and the second aqueous solution is an anionic aqueous solution.

Example 13 includes the method of example 11, wherein the first aqueous solution is an anionic aqueous solution and the second aqueous solution is a cationic aqueous solution.

Example 14 includes the method of example 10, wherein the particulate material is at least one of graphene, molybdenum diselenide, molybdenum disulfide, or tungsten diselenide.

Example 15 includes the method example 10, wherein applying the first and second aqueous solutions includes spraying the first and second aqueous solutions through a spray nozzle and a spray nozzle manifold.

Example 16 includes a method, comprising preparing an aircraft component by at least one of applying a chemical treatment to form a substrate or applying a mechanical treatment to form the substrate, the substrate having a first charge, depositing a first aqueous solution on the substrate, the first aqueous solution having a second charge opposite the first charge, removing a first portion of the first aqueous solution deposited on the substrate to form a first layer on the substrate, depositing a second aqueous solution on the first layer, the second aqueous solution having the first charge, and removing a second portion of the second aqueous solution deposited on the first layer to form a second layer on the first layer, the first and second layers forming insulation for the aircraft component.

Example 17 includes the method of example 16, wherein the first aqueous solution and the second aqueous solution each include one of graphene, molybdenum diselenide, molybdenum disulfide, or tungsten diselenide.

Example 18 includes the method of example 16, further including depositing the first aqueous solution on the second layer, the first aqueous solution at least partially including the first portion of the first aqueous solution.

Example 19 includes the method of example 16, wherein depositing the first and second aqueous solutions occurs at a first temperature, and further including heating the first and second layers to a second temperature higher the first temperature.

Example 20 includes the method of example 16, wherein the depositing the first aqueous solution and the second aqueous solution includes at least one of spraying the first aqueous solution and the second aqueous solution, applying roll-to-roll deposition, or dipping the aircraft component in the first and second aqueous solutions.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method to prepare an aircraft surface, comprising:
depositing a first solution on a substrate on the aircraft surface, the substrate having a first charge, the first solution having a second charge opposite the first charge;
removing a first amount of the first solution deposited on the substrate using a washing fluid to form a first layer on the substrate;
collecting a recovered solution including the first amount of the first solution and the washing fluid;
reconstituting the recovered solution to provide a third solution;
depositing a second solution on the first layer, the second solution having the first charge; and
removing a second amount of the second solution deposited on the first layer using the washing fluid to form a second layer on the first layer to prepare the aircraft surface.

2. The method of claim 1, further including:
depositing the third solution on the second layer, the third solution including at least a portion of the recovered solution; and
removing a third amount of the third solution deposited on the second layer using the washing fluid to form a third layer on the second layer.

3. The method of claim 1, wherein the first layer and the second layer provide increased insulation properties relative to layers formed by deposition of solutions of the same charge.

4. The method of claim 1, wherein the first solution includes a first particulate material, and the second solution includes a second particulate material, wherein the first particulate material and second particulate material include at least one of graphene, molybdenum diselenide, molybdenum disulfide, or tungsten diselenide.

5. The method of claim 1, wherein depositing the first solution includes spraying the first solution and depositing the second solution includes spraying the second solution.

6. The method of claim 1, wherein depositing the first solution and the second solution includes rolling the first and second solutions.

7. The method of claim 1, wherein depositing the first solution occurs at a first temperature, and further including heating the first and second layers to a second temperature higher than the first temperature.

8. The method of claim 1, wherein the substrate is a substrate layer, and further including at least one of chemically treating the aircraft surface or mechanically treating the aircraft surface to form the substrate layer on an aircraft component including the aircraft surface.

9. The method of claim 8, wherein the substrate layer includes silicon dioxide.

10. The method of claim 1, wherein the first solution is a cationic solution, and the second solution is an anionic solution.

11. The method of claim 1, wherein the first solution is an anionic solution, and the second solution is a cationic solution.

12. The method claim 5, wherein spraying the first solution and the second solution includes spraying the first solution and the second solution through a spray nozzle and a spray nozzle manifold.

13. The method of claim 1, wherein depositing the first solution and the second solution includes dipping the aircraft surface in the first and second solutions.

14. The method of claim 1, wherein the first solution includes a first particulate material, and the second solution includes a second particulate material, the first particulate material same as the second particulate material.

15. The method of claim 1, wherein the first solution includes a first particulate material, and the second solution includes a second particulate material, the first particulate material different than the second particulate material.

16. The method of claim 1, wherein at least one of the first solution or the second solution is an aqueous solution.

17. The method of claim 1, wherein at least one of the first solution or the second solution is a non-aqueous solution.

18. The method of claim 1, wherein depositing the first solution and the second solution are performed in a work cell having ambient temperature and ambient pressure.

19. The method of claim 1, wherein the third solution includes a composition range similar to the first solution.

20. The method of claim 1, further including:

depositing the first solution on the second layer; and removing a third amount of the first solution deposited on the second layer using the washing fluid to form a third layer on the second layer.

* * * * *